Figure 7:
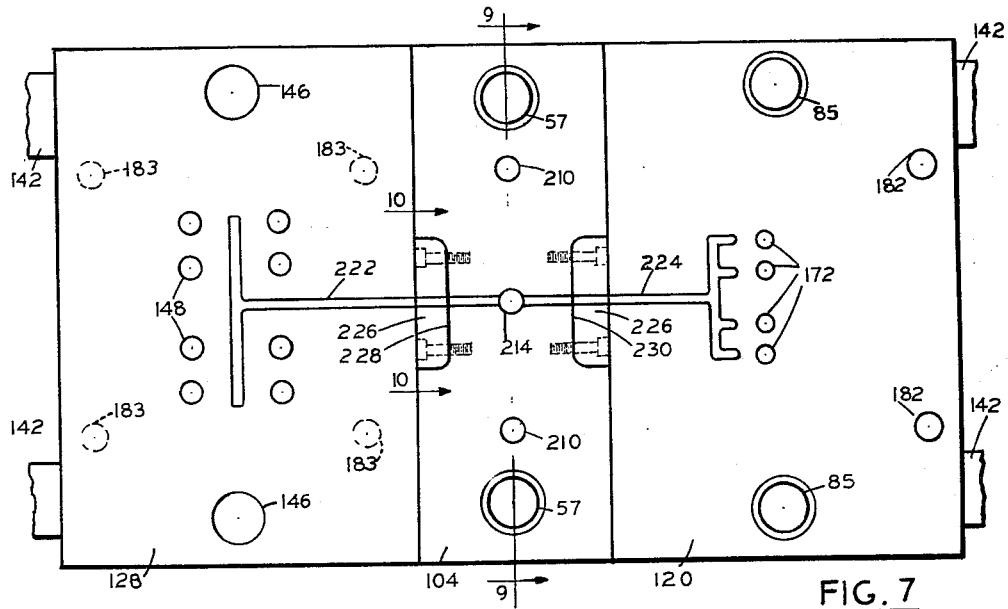

March 23, 1965  R. W. CUTLER ETAL  3,174,189
PLASTIC INJECTION MOLD
Filed June 17, 1963  4 Sheets-Sheet 1
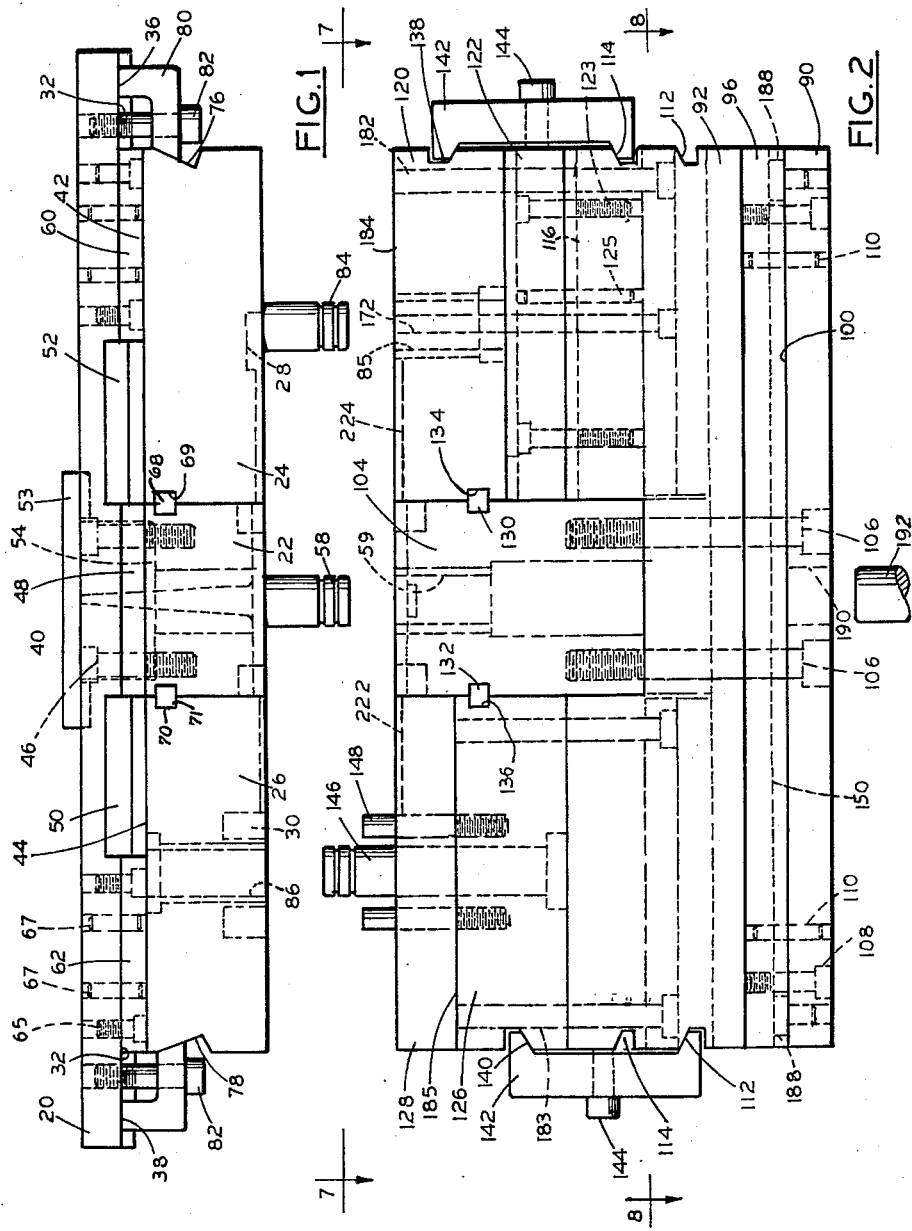
INVENTOR.
ROBERT W CUTLER
BERNARD W RUBLEY
BY 
ATTORNEY

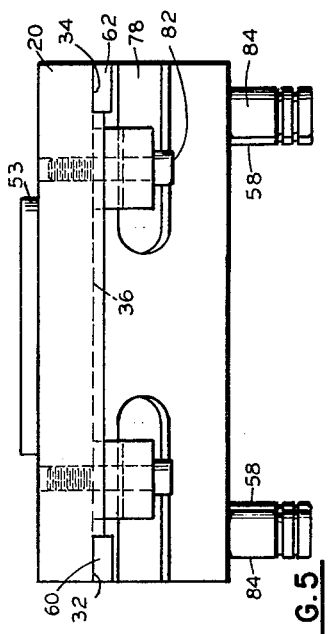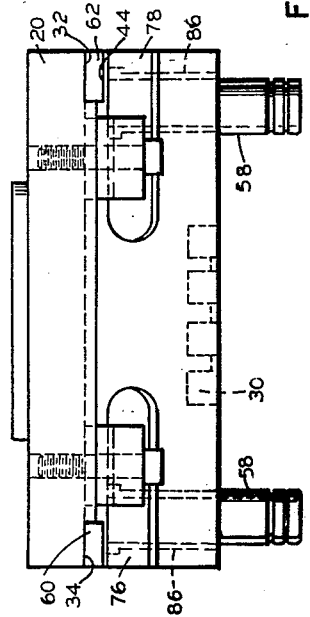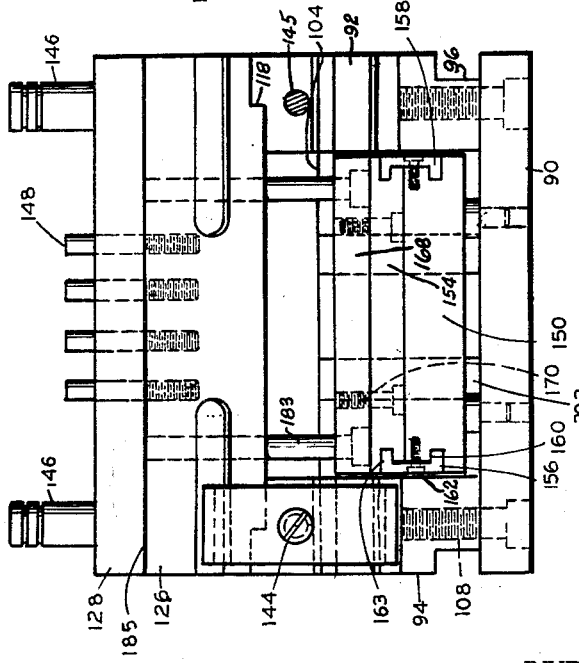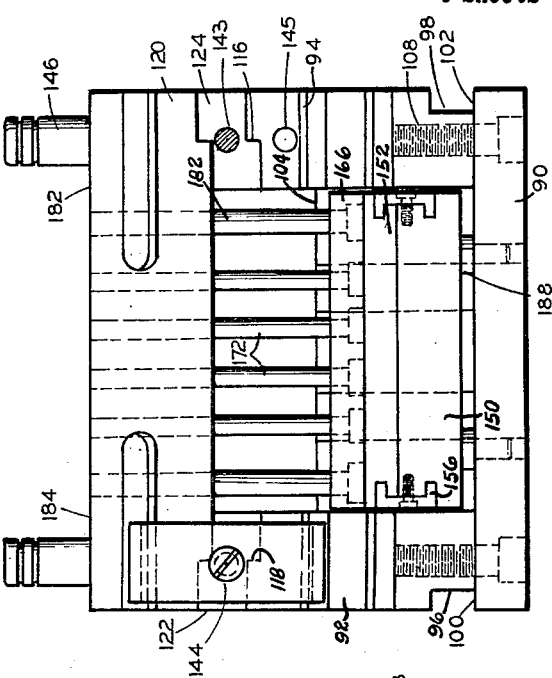

March 23, 1965 R. W. CUTLER ETAL 3,174,189
PLASTIC INJECTION MOLD
Filed June 17, 1963 4 Sheets-Sheet 4

INVENTOR.
ROBERT W. CUTLER.
BERNARD W. RUBLEY.
BY
ATTORNEY

United States Patent Office 3,174,189
Patented Mar. 23, 1965

3,174,189
PLASTIC INJECTION MOLD
Robert W. Cutler, 46 Lake Road, Webster, N.Y., and Bernard W. Rubley, 57 Tamarack Drive, Rochester, N.Y.
Filed June 17, 1963, Ser. No. 288,338
7 Claims. (Cl. 18—42)

This invention relates to plastic molding machines, and more particularly to a holder for plastic molds.

More particularly the invention is directed to a holder that remains in the press for plastic molds which contain the sprue bushing, common ejection system and locating and locking in means for interchangeable mold units which mold units are quickly removable from and placed in the holder. The invention further has to do with provisions for locating the mold units in the ejection and injection sides of the holder, through the use of inter-engaging steps, and locking keys in the cenetr sections of the holder. Each mold unit is provided with leader pins and bushings, and an ejection system that is readily removable from and replaced upon a master ejector plate that is a part of the holder. The invention further has to do wtih provision for simultaneously utilizing a stripper plate mold unit in combination with an ejector mold unit, or two units or a single unit of either and means to block off the runner where a single unit is employed.

Figure 8:
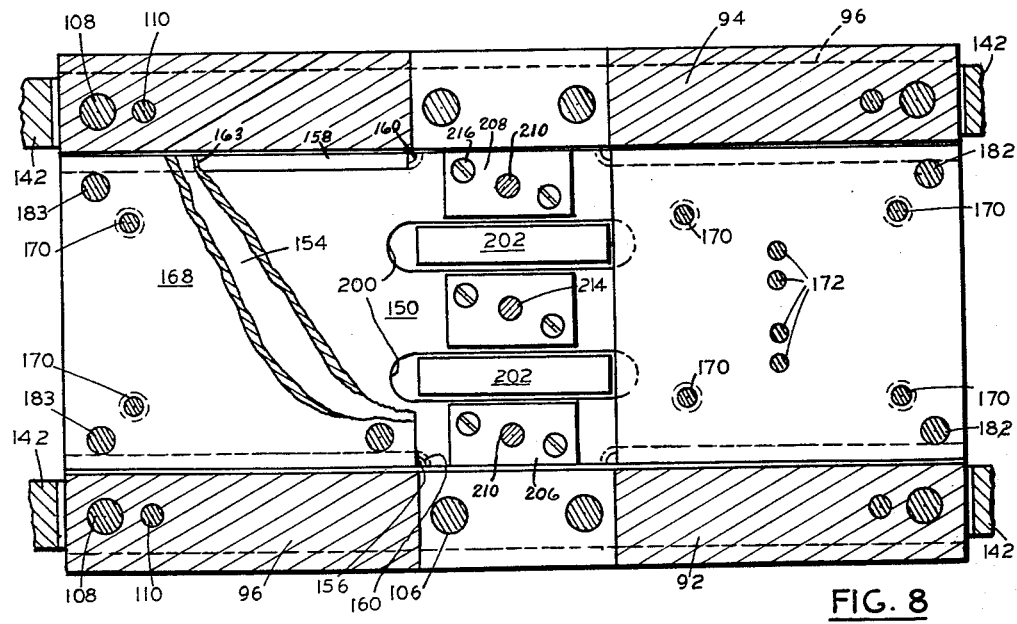
Figure 9:
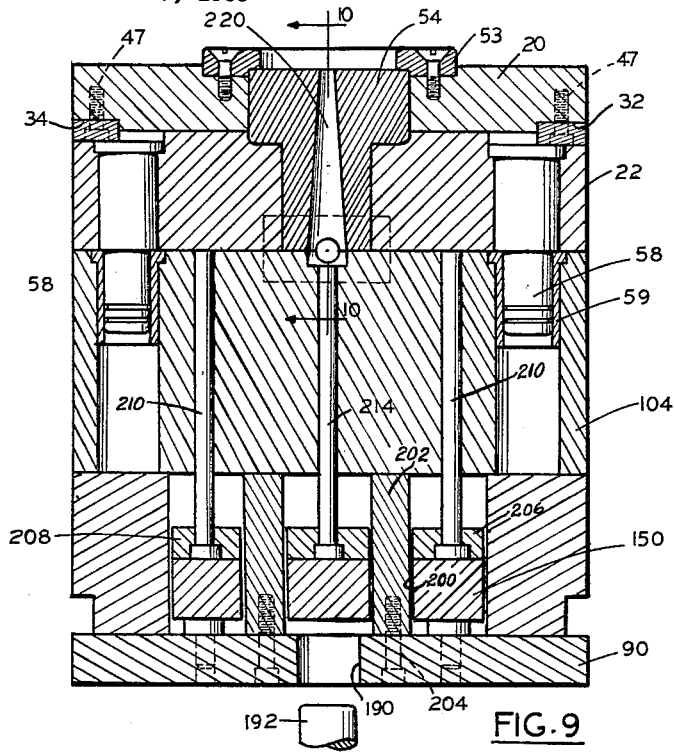
Figure 11:
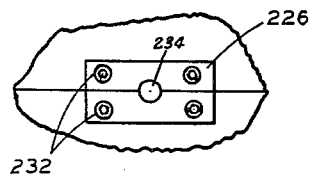
Figure 12:
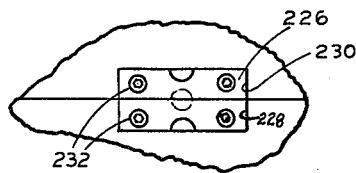
Figure 10:
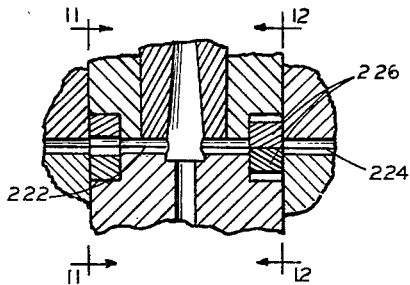

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims:

In the drawings wherein like reference characters indicate like parts:

FIGURE 1 is a plan view of a front mold assembly;
FIGURE 2 is a plan view of a back mold assembly;
FIGURE 3 is an end elevational view of the left hand end of FIGURE 1;
FIGURE 4 is an end elevational view of the left hand end of FIGURE 2;
FIGURE 5 is an end elevational view of the right hand end of FIGURE 1;
FIGURE 6 is an end elevational view of the right hand end of FIGURE 1;
FIGURE 7 is a plan view of the back mold assembly as viewed from the plane 7—7 of FIGURE 2 with end clamp broken away;
FIGURE 8 is a sectional view taken on the line 8—8 of FIGURE 2, with parts broken away;
FIGURE 9 is a sectional view of the mold assemblies in closed position and taken on the section line 9—9 of FIGURE 7;
FIGURE 10 is a fragmentary sectional view taken on the line 10—10 of FIGURE 9, and
FIGURES 11 and 12 are fragmentary sectional views taken on the lines 11—11 and 12—12 respectively of FIGURE 10.

Referring to FIGURES 1 and 2 wherein the die assemblies, which for convenience may be referred to as front and back, are shown as partially open, the upper or front assembly comprises a clamping plate 20, upon which are mounted a central section 22, and mold plates 24 and 26 having cavities as indicated at 28 and 30 respectively. The clamping plate 20 has rabbet grooves 32 and 34 extending along its side edges and transverse clamp receiving grooves 36 and 38 extending crosswise adjacent its ends. The cented section 22, and the mold plates 24 and 26 have corresponding rabbet grooves 40, 42 and 44 respectively facing the grooves 32 and 34. The central section 22 is secured to the clamping plate by four socket head cap screws 46 threaded into the corner regions of the center section, and the center section is laterally located with reference to the plate 20 by rectangular sectioned keys 48 secured in the central portions of the rabbets 32 and 34 of the clamping plate 20 by socket head screws 47. The mounting plate 20 is provided with clamping recesses 50 and 52 along its opposite sides by which the mounting plate may be secured to the front platen of the molding machine.

The clamping plate is provided with a locating ring 53, preferably recessed therein, and the clamping plate 20 and central section 22 are also provided with a sprue bushing 54. The central section 22 is also provided with two leader pins 58. The rabbet grooves 32 and 34 are provided with mold plate locating keys or blocks 60 and 62, affixed to the clamping plate by socket head cap screws 65, and may be dowelled as at 67 to the clamping plate for accurate location. The members so far referred to except the mold plates 24 and 26, may be relatively permanently affixed to the front platen of the molding machine.

The central section 22 is provided with locating rails or keys 68 and 70 recessed in the opposite faces thereof, and may be secured therein by small socket head cap screws (not shown) and the mold plates 24 and 26 have corresponding grooves 69 and 71 to embrace the rails 68 and 70. The mold plate rabbet grooves 42 and 44 along their side edges interfit with the keys 60 and 62, and the opposite ends of the mold plates are provided with spaced clamping grooves 76 and 78 having inclined faces for receiving spaced L clamping members 80, the heel portions of which are seated in the mounting plate grooves 36 and 38. The members 80 are provided with clamp screws 82 threaded in the clamping plate 20 to lock the mold plates 24 and 26 in place. The mold plate 24 may be provided with two leader pins 84, since it is adapted for use with ejector pins, whereas the mold plate 26 is provided with leader pin bushings 86, since it is adapted to coact with a stripper plate, on the back mold assembly.

Referring to the rear assembly, there is shown an ejector housing comprising a base 90, and heavy side members 92 and 94, the side members having rabbet grooves 96 and 98 to expose the marginal edges 100 and 102 of the base plate for clamping to the rear platen of a molding machine. The side members are centrally recessed to receive a heavy transverse center section 104. The center section has bushings 59 to receive leader pins 58. The side members base and center sections are secured together by heavy socket head screws 106, and the base and side members are secured together at the ends with socket head screws 108. Dowel pins as at 110 may also be provided. The ends of the side members are provided with two clamp grooves as at 112 and 114. The upper faces of the side members are provided with locating offsets 116 and 118, and are adapted to support a mold plate such as 120 through spacer rails 122 and 124 (see FIGURE 6), or a back up plate such as 126 (see FIGURE 4), for a stripper plate 128. The spacer rails 122 and 124 have offsets on their upper and lower faces, and are held to the side members 92 and 94 by countersunk screws 123 and a dowel pin 125.

The center section 104 is provided with locating rails 130 and 132 recessed in grooves in the center section side walls, and are held therein by small socket head screws (not shown), and the mold plate 120, and back up plate 126 have grooves 134 and 136 respectively to engage the rails 130 and 132. The mold plate 120 and back up plate 126 also have clamp grooves 138 and 140 respectively and clamps 142 secured by bolts 144, threaded into the spacer rails 122 and 124 in the threaded apertures as at 143 or in threaded apertures 145 in the side wall ends, are adapted to secure the mold plate 120, and back up plate 126 in position, the clamps engaging one or the other of grooves 112 or 114. It will be seen that the back up plate is provided with leader pins 146, upon which the stripper plate 128 slides, and may carry one or more core pins 148 mounted in the back up plate, which pins project through apertures in the stripper plate 128, the end projections of such pins cooperating with the cavities 30, as desired.

The ejector assembly located within the ejector housing comprises a master ejector plate 150, which is of a length corresponding to the length of the base 90. On the opposite ends of the master ejector plate are secondary ejector plates 152 and 154, that are slidably held upon the master ejector plate by elongated channel section locating rails 156 and 158, the lower flanges of which are secured in side grooves 160 milled in the master ejector plate, as by countersunk cap screws 162. The upper flange of the channel rails slidably engage the side grooves 163 of the secondary plates 154 and 152.

The secondary ejector plates 152 and 154 are adapted to have affixed thereto ejector pin retainer plates 166 and 168, and such retainer plates may be affixed to the secondary plates by a number of cap screws 170 threaded into the ejector pin plates and countersunk in the secondary plates. The pin retainer plates may be provided with ejector pins such as 172 and cooperating with the mold plate 120, and may have push back pins 182, located in the corners, the heads of the pins being countersunk in the ejector pin plates, and held between the ejector pin plate 166 and secondary plate 152. The push back pins terminate flush with the surface 184 of the mold plate 120, or where a stripper plate such as 128 is employed, the ends of the push back pins 183, held between plates 168 and 154, will normally lie flush with the surface 185 of the back up plate 126. It will be understood that the base 90 may be provided with four stop pins 188 to engage the master ejector plate to limit its retracted location, and that the base plate 90 will also have one or more apertures therein such as 190 through which an ejector plate operating bumper 192 may project, when the rear platen with the rear assembly is fully retracted, such bumper serving to move the ejector master plate, push pins and ejector pin so as to move the stripper plate 126 forward on its leader pin 146 and core pins 148 to strip the molded plastic objects from the core pins 148, and to project the ejector pins for ejecting the molded objects from the mold plate 120.

The master ejector plate 150 may also have apertures 200 through which may extend support pillars 202, which are secured to the base 90 as by screws 204, and which abut the under surface of the center section 104 to provide support thereto. The master plate may also have blocks 206 and 208 secured thereto from which extend center section push back pins 210, and a center block 212 from which a sprue puller pin 214 may extend. Such blocks are secured to the master plate by screws 216.

As can be seen in FIGURES 9 and 10, the sprue bushing 54 has a tapered sprue bore 220 leading to runners 222 and 224 in the center sections 22 and 104. Each of the sections 22 and 104 are provided with removable runner stop blocks 226, held in corresponding recesses 228 and 230 in the sections 22 and 104, as by socket head screws 232. Such blocks have runner grooves 234. The stop blocks, by reversing their position as shown in the right hand side of FIGURE 10, and in FIGURE 12, may be employed to block off the runners leading thereto, when no mold cavities are to be used, as when the mold assemblies are employed to utilize a single set of mold cavity plates on one side or the other. It will be understood that the mold plates 24 and 26, stripper plate 128, and mold plate 120, and other parts may be ported as desired for water cooling, according to standard practice.

From the foregoing description, it will be seen that the plate 20 may be affixed in a permanent fashion to the front injection platen of the molding machine, and that the base 90 may likewise be affixed in a permanent fashion to the rear or back and movinng platen of the molding machine. It will also be apparent that by removing the clamps 80 and 142, at either end of the mold, the cavity plates such as 24 and 120, with its ejection assembly plates 166 and 152 may be removed from the assemblies as a unit without disturbing the permanent affixation of the plate 20 and base 90 to their respective platens. The ejector plates 152 and 166 will freely slide from the master plate 150 with the mold plate 120, and the mold plates 120 and 24 by reason of their cooperating leader pins 84 and bushings 85, form a removable or replaceable molding unit together with their ejector plate assembly and ejector pins 172. Either side of the mold may have the mold cavity plates removed together with the ejector or push back pin plate assembly, to permit the installation of a different mold set. When a stripper plate assembly is to be applied to the mold, the spacer rails 122 and 124 are quickly removed. In practice, the mold plate 120 may be made thicker for deep cavities, or for greater rigidity in which case the spacers 122 and 124 may be eliminated, the thicker plate being held by clamp 142 employing the clamp grooves 112. Such plate may be made of two thicknesses, with the top plate affixed to the lower plate if desired, the lower plate being provided with clamp grooves similar to 140 in plate 126. If but one side of the mold assembly is to be used, the runner ducts leading to the unused side may be blocked off by reversing the runner stop blocks 226.

It will be seen from the foregoing that the assemblies are economical to manufacture, that maximum mold space is provided in the units. In addition rapid change over of mold units may be had. Further the mold assemblies may operate upon an ejector mold unit and a stripper mold unit simultaneously, or be quickly adapted to utilize two ejector units, or two stripper type units. The construction further provides for positive location of the parts with holding clamps that are readily accessible, and quickly applied and removed.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:
1. A plastic mold holder comprising, a front mold assembly comprising a rectangular clamping plate, a center sprue section disposed transversely across the center of said plate and secured thereto and having two leader pins projecting therefrom from the end regions, locating keys disposed along the side edges of said plate, locating rails mounted in the opposite sides of said center section, a mold plate having a groove in one end face to engage one of said rails, and having rabbets along its side edges to fit said keys, clamp means cooperating with a transverse groove in the end of the clamping plate and grooves in the opposite end face of said mold plate for securing said mold plate to the clamping plate and center section, a rear mold assembly comprising a rectangular base plate and upstanding side members to form a channel section ejector housing, said side members having central recesses, a heavy transverse central section extending transversely across the central region of said rear assembly and having its ends seated in said recesses, locating rails mounted in the sides of said central section, and guide bushings disposed in said central section adapted to receive said leader pins of the center section of the front assembly, said side members having offset grooves along their side edges, plate means having complementary grooves to engage said offset grooves along their side edges, and a groove to mate with a rail of said central section on one end, and clamp grooves in its opposite end, clamp means coacting with clamp grooves in the side member ends and plate means clamp grooves, a master ejector plate disposed in said ejector housing and extending beneath said central section and of a length commensurate with said base, and having grooves in its side edges leading in from the ends thereof, a secondary ejector plate of a width corresponding to that of the master plate, and of a length less than the distance from the end of the master plate to the central section, said secondary plate having grooves in its side edges, channel section keys secured to the master plate and having their side flanges disposed in a side groove of said master ejector plate and a side groove of said secondary plate, whereby the secondary plate is slidably mounted on said master plate, a back up pin plate secured to said secondary plate and having back up pins projecting therefrom through apertures in said plate means, with the heads thereof recessed in the pin plate, leader pin and bushing means in said plate means and mold plate, back up pins slidably disposed in said central section and having their pin heads secured to the control region of said master ejector plate, a sprue in said center section, and runners extending from said sprue crosswise of said center and central sections in the mating surfaces thereof, removable blocks recessed in the face and sides of said center and central sections and extending across said runners, said removable blocks having a runner groove in one face only thereof adapted to line up with the runner grooves in the center and central sections, said blocks being adapted to be inverted to block off their respective center and central section runner grooves, a sprue pin slidably disposed in said central section aligned with said sprue, said sprue pin having a head secured to said master ejector plate, said master ejector plate having an aperture in its central region beneath said central section, and a support column extending from said base to said central section and extending through said aperture.

2. A plastic mold holder comprising, a front mold assembly comprising a rectangular clamping plate, a center sprue section disposed transversely across the center of said plate and secured thereto and having two leader pins projecting therefrom from the end regions, locating keys disposed along the side edges of said plate, locating rails mounted in the opposite sides of said center section, a mold plate having a groove in one end face to engage one of said rails, and having rabbets along its side edges to fit said keys and clamp means cooperating with a transverse groove in the end of the clamping plate and grooves in the opposite end face of said mold plate, for securing said mold plate to the clamping plate and center section.

3. A plastic mold holder comprising a front mold assembly according to claim 2 in which the center section is provided with a center sprue, and transverse runner grooves, and in which the sides of said sections are provided with recesses extending across said runner grooves, and a removable block in each of said recesses, having a runner groove in one side only aligned with said transverse runner grooves, said block being adapted to be inverted in said recesses to block off a transverse runner groove.

4. A plastic mold holder comprising a rear mold assembly comprising a rectangular base plate and upstanding side members to form a channel section ejector housing, said side members having central recesses, a heavy transverse central section extending transversely across the central region of said rear assembly and having its ends seated in said recesses, locating rails mounted in the sides of said central section, and leader pin guide means disposed in said central section, said side members having offset grooves along their side edges, plate means having complementary grooves to engage said offset grooves along their side edges, and a groove to mate with a rail of said central section on one end and clamp grooves in its opposite end, clamp means coacting with clamp grooves in the side member ends and plate means clamp grooves, a master ejector plate disposed in said ejector housing and extending beneath said central section and of a length commensurate with said base, and having grooves in its side edges leading in from the ends thereof, a secondary ejector plate of a width corresponding to the master plate, and of a length less than the distance from the end of the master plate to the central section, said secondary plate having grooves in its side edges, and channel section keys secured to the master plate and having their side flanges disposed in a side groove of said master ejector plate and a side groove of said secondary plate, whereby the secondary plate is slidably mounted on said master plate.

5. A plastic mold holder comprising, a front mold assembly comprising a rectangular clamping plate, a center sprue section disposed transversely across the center of said plate and secured thereto and having two leader pins projecting therefrom from the end regions, locating keys disposed along the side edges of said plate, locating rails mounted in the opposite side of said center section, a mold plate having a groove in one end face to engage one of said rails, and having rabbets along its side edges to fit said keys, clamp means cooperating with a transverse groove in the end of the clamping plate and grooves in the opposite end face of said mold plate for securing said mold plate to the clamping plate and center section, a rear mold assembly comprising a rectangular base plate and upstanding side members to form a channel section ejector housing, said side members having central recesses, a heavy transverse central section extending transversely across the central region of said rear assembly and having its ends seated in said recesses, locating rails mounted in the sides of said central section, and guide bushings disposed in said central section adapted to receive said leader pins of the center section of the front assembly, said side members having offset grooves along their side edges, plate means having complementary grooves to engage said offset grooves along their side edges, and a groove to mate with a rail of said central section on one end and clamp grooves in its opposite end, clamp means coacting with clamp grooves in the side member ends and plate means clamp grooves, a master ejector plate disposed in said ejector housing and extending beneath said central section and of a length commensurate with said base, and having grooves in its side edges leading in from the ends thereof a secondary ejector plate of a width corresponding to that of the master plate, and of a length less than the distance from the end of the master plate to the central section, said secondary plate having grooves in its side edges, and channel section keys secured to the master plate and having their side flanges disposed in a side groove of said master ejector plate and a side groove of said secondary plate, whereby the secondary plate is slidably mounted on said master plate.

6. A plastic mold holder comprising a front mold assembly having a center section having a sprue, and a rear mold assembly having a central section adapted to mate with said center section, runner grooves in the mating surfaces of said center and central sections extending from said sprue, and removable blocks recessed in the face and sides of said center and central sections, and extending across said runner grooves, said removable blocks having a runner groove in one face only thereof adapted to line up with the center and central section runner grooves, said blocks being adapted to be inverted to block off their respective center and central section runner grooves.

7. A plate mold holder comprising, a front mold assembly comprising a rectangular clamping plate, a center sprue section disposed transversely across the center of said plate and secured thereto and having two leader pins projecting therefrom from the end regions, means for locating a mold plate on either side of said section including a locating rail mounted in the opposite sides of said central section and guide keys along the side edges of said plate, and clamp means cooperating with a transverse groove in the end of the clamping plate for securing a mold plate to the clamping plate against said center section, a rear mold assembly comprising a channel section ejector housing, a heavy transverse central section extending transversely across and bridging the central region of said housing, locating rails mounted in the sides of said central section, and guide bushings disposed in said central section adapted to receive said leader pins of the center section of the front assembly, locating grooves extending along the edges of the side flanges of said channel section housing clamp means coacting with clamp grooves in the side flange ends for securing a mold plate on said locating grooves and against said central section, a master ejector plate disposed in said ejector housing extending beneath said central section and of a length commensurate with said base, secondary ejector plates disposed on the opposite ends of the master plate, and means for securing said secondary plates slidably along their side edges to said master plate, a pin plate secured to said secondary plate and having back up pins projecting therefrom through apertures in said pin plate with the heads thereof recessed in the pin plate, said back up pins being adapted for return movement of said master plate by direct contact with the front mold assembly, or through a stripper plate carried by the rear mold assembly.

References Cited in the file of this patent
UNITED STATES PATENTS

| | | |
|---|---|---|
| 2,672,653 | Simpkins et al. | Mar. 23, 1954 |
| 2,773,284 | Kelly | Dec. 11, 1956 |
| 2,874,409 | Quarnstrom | Feb. 24, 1959 |
| 2,876,495 | Spillman | Mar. 10, 1959 |

FOREIGN PATENTS

| | | |
|---|---|---|
| 1,178,357 | France | Dec. 8, 1958 |